Patented Jan. 27, 1942

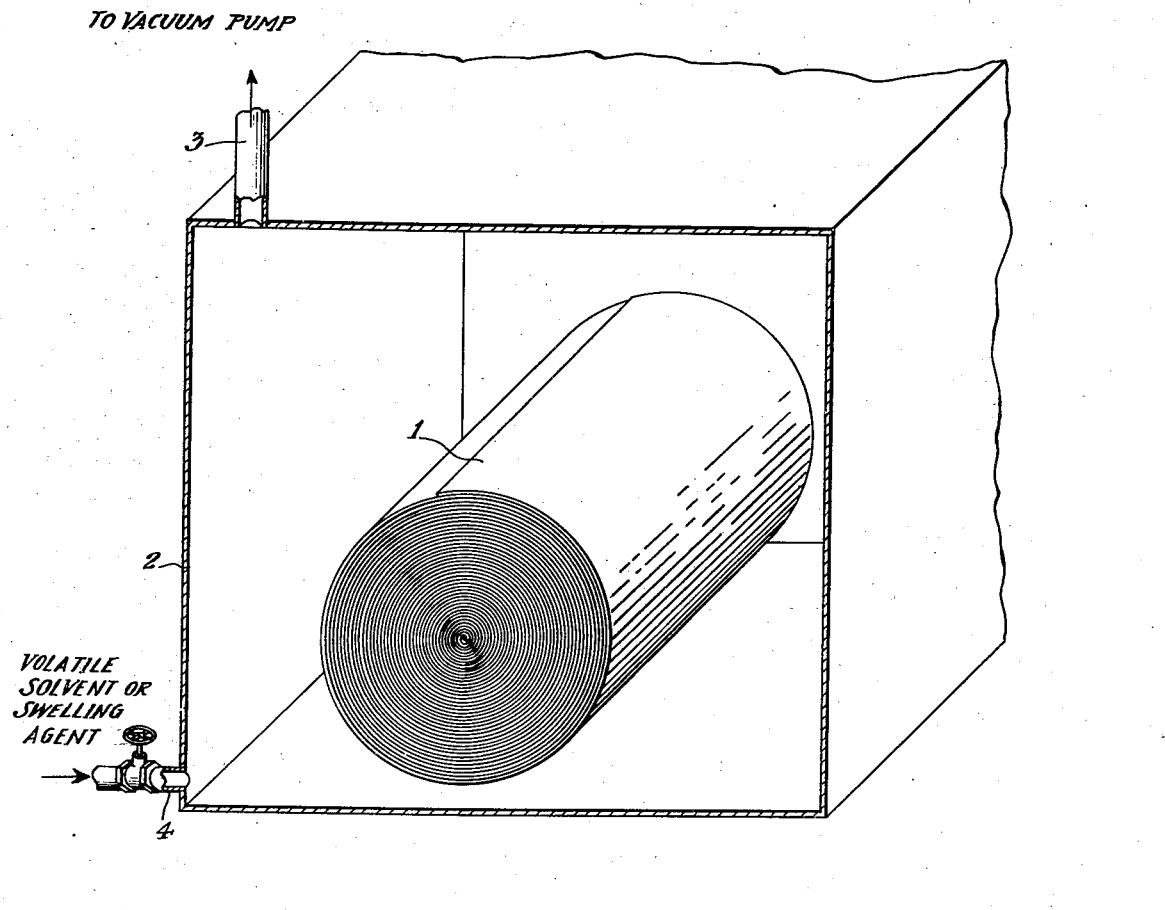

2,271,192

UNITED STATES PATENT OFFICE 2,271,192

PROCESS OF TREATING PLASTIC SHEETS

Gerhard Hinz, Berlin-Schoneberg, Germany, assignor to Sherka Chemical Co. Inc., Bloomfield, N. J., a corporation of New York Application November 18, 1938, Serial No. 241,294
In Germany November 18, 1937

1 Claim. (Cl. 18—56)

This invention relates to improved articles cut or stamped from sheets of film-forming plastic masses and a process of making the same.

Films, foils, strips, bands and similar artificial articles from sheets of film-forming plastic masses, as for example cellulose derivatives, polyvinyl compounds, polyacrylic acid esters, polystyrenes and the like, have as is known the disadvantage that they easily tear at their edges, that is to say at their cut edges or perforation edges. It is certainly known to cast film bands in the necessary width but this process is very cumbersome, requires cumbersome apparatus and moreover in many cases cannot be employed.

In accordance with the present invention this disadvantage of the artificial articles cut or stamped from sheet material, at present employed in increasing quantity, can be avoided in such a manner that these articles, in particular film strips or foil bands are swelled or dissolved at their edges and thereupon further allowed to solidify.

For carrying out this process for a swellable plastic material for example a suitable swelling agent or solvent such as methylene chloride, chloroform, acetone or ethyl acetate, or mixtures of such solvents with one another or with non-solvents are employed. In the case of thermoplastic articles it is possible to proceed in such a manner that the borders or cut edges are subjected to the action of elevated temperature, for example melted in suitable apparatus, but in accordance with the present invention it is supplemented by simultaneous presence of liquid or vaporised swelling agents or solvents. By these operations such a strengthening and smoothening of the cut edges is attained that for example cinematograph films do not tear at their perforations or film bands for electrical insulating purposes can be wound round any cables or objects of electro-technics without danger of tearing.

The new process can advantageously be carried out in such a manner that tightly wound rolls of film or band are left for some time at ordinary or elevated temperature in an atmosphere of the suitable solvent or swelling agent and then dried; by this means only the extreme edge portions of the band are swelled while the interior remains practically unaffected. The swelling at ordinary temperature takes place for up to two hours or even longer but can by increase of temperature be considerably shortened. The process can, however, be carried out in any other manner, for example such that the band roll is moistened with a sponge, wadding pad or the like which is saturated with the solvent or swelling agent or laid on the surface of a swelling or solvent liquid for quite a short time. Finally it is also possible to moisten the film or band continuously on its two edges with suitable agents and by this means likewise to attain a smoothening and solidifying or strengthening of the edges.

In the accompanying drawing constituting a part thereof, the single figure is a diagrammatic view illustrating one mode of operation of the present invention.

The sheet of plastic material is wound into a tight roll 1, which is placed in sealed chamber 2, connected to a vacuum pump by pipe 3. An inlet is provided at 4 for swelling agent or solvent. The chamber 2 is evacuated and a suitable amount of solvent or the like introduced into the chamber through inlet 4 for a sufficient time to affect the edges only of the roll, which is thereafter removed from the chamber.

The swelled films, bands and so on need not always, prior to further use, be freed from swelling agent or solvent for example by drying. The swollen films, bands and the like can also be employed immediately, for example as winding material in electro-technics and only subsequently the edges solidified by drying for example in a drying oven. This is advantageous for motor parts, bobbins and similar objects of electro-technics which are wound by hand labour.

Thus for example cut film strips from polyvinyl chloride are swelled with methylene chloride. Or bands of cellulose triacetate foils, which as is known find application with particular advantage as insulating agents in electro-technics, are swelled with methylene chloride or mixtures of methylene chloride with other solvents or non-solvents, for example with a mixture of methylene chloride and alcohol or of chloroform and alcohol. The bands must obviously be swelled only so far or in such a manner that they do not stick together. By preliminary experiments it can easily be ascertained by what swelling agent or swelling agent mixture and in what time of treatment and at what temperature the optimum effect is attained The process according to the invention can obviously also find application in the case of numerous other suitable swellable or soluble or thermoplastic articles, for example in the case of films and foils from polyacrylic and methacrylic acid esters, polyvinyl resins, mixed polymerisates and cellulose derivatives of most varied constitution.

The effect of the above described treatment can be still further increased when the above specified articles are swelled or dissolved with the swelling agent or solvent in vacuum or after a vacuum treatment. Probably by this means there takes place a removal of the air layer still adhering to the cut edges so that the wetting and subsequent swelling take place more effectively. In addition by this means a greater volatility of the solvent or swelling agent employed is attained.

The vacuum treatment is for example carried out in such a manner that foils, films, bands and the like for example from cellulose triesters or similar film-forming substances or their cut edges are subjected in the presence of swelling agents or solvents under a vacuum for example of 200-300 mm. without these agents being in immediate contact with the foils and the like. By this means there takes place an evaporation of the solvents which act in the vapour state upon the objects to be treated. The evaporation can be accelerated by temperature increase which comes into consideration, particularly in the case of high boiling solvents.

This process can also be carried out in such a manner that the objects are evacuated in the absence of the solvents or swelling agents and subsequently immediately brought into contact with the liquid solvent or swelling agent.

The films, bands and the like treated according to the invention are in the rigidity of their edges equivalent to the extruded or cast bands and can be wound on customary winding machines with normal speed of rotation without difficulty.

The following examples illustrate the invention:

Example 1

A ready wound cinematograph film of cellulose triacetate is subjected for some minutes in vacuum to the vapours of methylene chloride. Thereupon the film thus treated is carefully led over rollers and dried with warm air. The winding numbers of a cinematograph film thus treated have been increased compared with the nontreated film by about 50-70%.

Example 2

Insulating bands from cellulose triacetate, as are employed in electrotechnics for the winding of former bobbins, are wound in flat rolls and subjected to the action of methylene chloride vapours in vacuum. The treated bobbins are worked up and the formers obtained thereupon dried. By the treatment the tearing resistance of the bands is increased from about 2 kg. to 9 kg.

The same result as in the above mentioned example is attained by treatment of bands from polyvinyl compounds or mixed polymerisates, as for example the products from polyvinyl chloride found in commerce under the name "Vinifol." For this purpose suitably chloroform, acetone or similarly acting solvents are employed.

Of course, many other changes and variations may be made by those skilled in the art in accordance with the principles set forth herein and in the claim annexed hereto.

What I claim is:

The process for improving articles cut or stamped from sheets of organic, film-forming, plastic masses which comprises rolling said articles into a roll, the edges of which comprise the cut edges of said articles, subjecting said roll to a vacuum, and applying a swelling agent or solvent thereto sufficient to cause swelling of the cut edges only.

GERHARD HINZ.